United States Patent [19]
Fujita et al.

[11] Patent Number: 5,315,523
[45] Date of Patent: May 24, 1994

[54] NUMERICAL CONTROL APPARATUS HAVING A WORK SIMULATION FUNCTION

[75] Inventors: Naoki Fujita; Teruyuki Matsumura; Koichi Murata, all of Oshino, Japan

[73] Assignee: Fanuc Ltd., Yamanashi, Japan

[21] Appl. No.: 866,184
[22] PCT Filed: Nov. 8, 1991
[86] PCT No.: PCT/JP91/01536
  § 371 Date: Jun. 30, 1992
  § 102(e) Date: Jun. 30, 1992
[87] PCT Pub. No.: WO92/08574
  PCT Pub. Date: May 29, 1992

[30] Foreign Application Priority Data
  Nov. 8, 1990 [JP] Japan .................. 2-303102
[51] Int. Cl.$^5$ ............................................. G06F 15/46
[52] U.S. Cl. ........................ 364/474.22; 364/474.24
[58] Field of Search ................ 364/474.22, –474.26

[56] References Cited
U.S. PATENT DOCUMENTS

| | | | |
|---|---|---|---|
| 4,725,960 | 2/1988 | Shima et al. | 364/474.26 |
| 4,788,481 | 11/1988 | Niwa | 318/600 |
| 4,922,440 | 5/1990 | Kawamura et al. | 364/474.22 |
| 5,043,644 | 8/1991 | Sasaki et al. | 318/568.23 |
| 5,126,646 | 2/1992 | Fujita et al. | 318/569 |
| 5,150,305 | 9/1992 | Sekikawa | 364/474.26 |
| 5,175,688 | 12/1992 | Sasaki et al. | 364/474.22 |

FOREIGN PATENT DOCUMENTS

| | | |
|---|---|---|
| 0188619 | 7/1986 | European Pat. Off. . |
| 58-158713 | 9/1983 | Japan . |
| 60-24604 | 2/1985 | Japan . |
| 0032112 | 2/1986 | Japan . |
| 61-111854 | 5/1986 | Japan . |
| 63-34052 | 2/1988 | Japan . |
| 0231105 | 9/1989 | Japan . |

OTHER PUBLICATIONS

E. Hohweiler et al. "Einsatz der Rundachse fur die Komplettbearbeitung auf CNC-Drehmaschinen", ZWF Zeitschrift fur Wirtschaftliche Fertigung und Automatisierung, vol. 83, No. 2, pp. 68–73, Feb. 1988, Munchen, DE.

Primary Examiner—Jerry Smith
Assistant Examiner—Cameron H. Tousi
Attorney, Agent, or Firm—Staas & Halsey

[57] ABSTRACT

A numerical control apparatus having a work simulation function for enabling both the workpiece and the movement of the tool to be displayed at any time on the same display screen during the work simulation. This is achieved by a variable display magnifications so that both the workpiece configuration change and the tool shift movement can always be checked adequately. The numerical control apparatus comprises a numerical control processor and an auto-programming processor. The numerical control processor determines a predetermined scale by which the workpiece can be fully displayed on a display screen of the display apparatus, calculates a scale by which both the workpiece and the tool can be displayed on the same display screen on the basis of the present tool position every time the numerical control program is executed by block for the work simulation, and further judges whether or not the scale change is necessary depending on the result of comparison between the predetermined scale and the calculated scale and also the scale used for the display relating to the previous program block so that change the scale can be changed when necessary. The auto-programming processor carries out the work simulation by selecting a display magnification corresponding to the determined scale.

5 Claims, 6 Drawing Sheets

NUMERICAL CONTROL APPARATUS HAVING A WORK SIMULATION FUNCTION

BACKGROUND OF THE INVENTION

1. Field of the Invention

The present invention relates to a numerical control apparatus having a work simulation function, and more particularly, to a numerical control apparatus capable of always and adequately checking both a workpiece configuration change and a tool shift movement in the work simulation.

2. Description of the Related Art

There has been known an interactive numerical control apparatus which executes a work simulation by use of a graphic animation in compliance with a numerical control program so that an operator can check whether the program is good or bad. This kind of apparatus carries out the work simulation by selectively changing its display magnification. For example, one of the display scales (first scale) is set to display both the workpiece and the tool located at a shift starting position together on a display screen. Another one of the display scales (second scale) is set to display an enlarged view of, for example, the workpiece.

Also, in the conventional apparatus, the display scale is not changeable during the work simulation. Where the overall shift trace of the tool is to be checked, the first display scale is preferable for executing the work simulation. In this case, however, the configuration change of the workpiece resulting from the cutting operation of the workpiece cannot be checked precisely.

On the other hand, where the workpiece configuration change (or the workpiece cutting process) is to be checked, the second display scale is preferable for executing the work simulation; however, it would be impossible to check the overall shift movement if the tool should shift beyond the scope of display.

SUMMARY OF THE INVENTION

The purpose of the present invention is to provide a numerical control apparatus having a work simulation function capable of displaying both the workpiece and the tool movement with respect to the workpiece at any time during the work simulation on a display screen at an adequate display magnification so that both the workpiece configuration change and the tool shift movement can always be checked adequately.

In order to accomplish above purpose, the present invention provides a numerical control apparatus having a work simulation function capable of displaying both the workpiece configuration change and the tool shift movement on the same display screen in accordance with the execution of a numerical control program. The numerical control apparatus comprises a scaling means for establishing a predetermined scale suitable for displaying the workpiece configuration change, an arithmetic means for calculating a scale by which both the workpiece and the tool at its present shifted position can be displayed together on the display screen on the basis of the present shifted position of the tool in compliance with the execution of the numerical control program, and a magnification determining means for determining the display magnification based on the result of comparison of the predetermined scale and the calculated scale so that the work simulation can be executed by the determined display magnification.

As is described above, in accordance with the present invention, the work simulation is carried out by the use of the display magnification obtained by taking into consideration both the predetermined scale suitable for displaying the workpiece configuration change in detail and the scale calculated based on the present shifted position of the tool as a result of the execution of the numerical control program.

Therefore, during the work simulation, both the workpiece and the tool shifting with respect to the workpiece are always and adequately displayed on the display screen. Thus, it becomes possible not only to check the workpiece configuration change in detail during the work simulation but also to adequately check the overall shifting locus of the tool. Accordingly, the program check can accurately be executed throughout the work simulation.

DETAILED DESCRIPTION OF THE PREFERRED EMBODIMENTS

Figure 1:
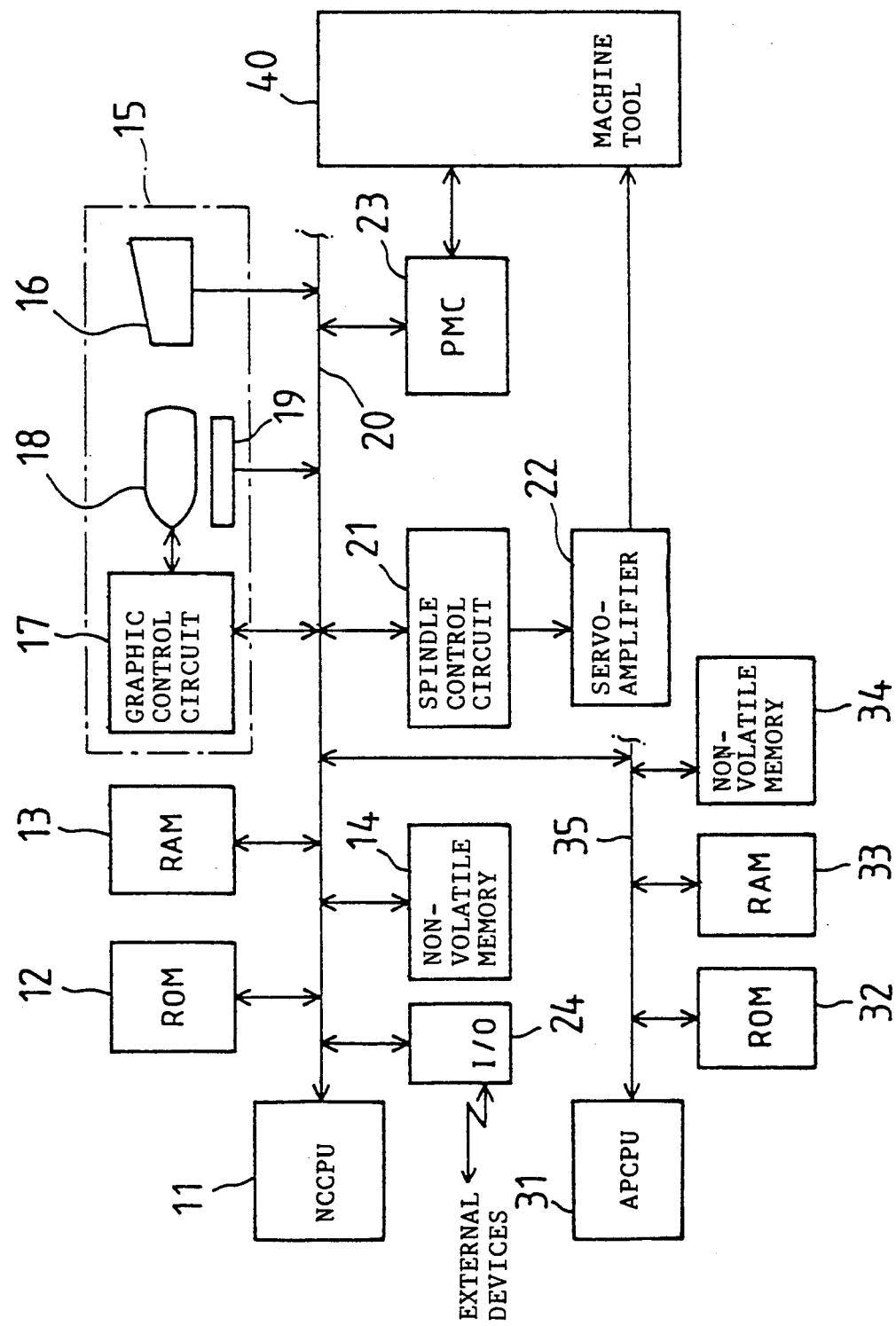
FIG. 1 is a schematic block diagram showing a numerical control apparatus in accordance with one embodiment of the present invention.

With reference to FIG. 1, an interactive numerical control apparatus equipped with a computer in accordance with one embodiment of the present invention comprises a control function for actuating an NC machine tool 40, an auto-programming function for automatically programming an NC program in the form of an interactive communication with an operator, and a work simulation function for checking whether the NC program is good or bad.

The machine tool 40 comprises, for example, a spindle motor for rotating a workpiece, actuators such as axis servo-motors each equipped with a pulse coder for shifting a tool, sensors for detecting operational conditions of the machine, and a machine operation board provided with operation switches.

The numerical control apparatus (Hereinafter, referred to as a CNC apparatus) comprises a numerical control processor (NCCPU) 11, a read only memory 12 such as an EPROM or an EEPROM storing a system program used for an overall control of the numerical control apparatus and a scaling program used for a later-described scale determining process and so on, a random access memory 13 such as an SRAM used for temporarily memorizing various data, and a non-volatile memory 14 such as a CMOS backed up by a battery.

Memories 12–14 are connected through a bus 20 to the NCCPU 11. The non-volatile memory 14 stores data to be reserved even after an electric power is turned off. For example, the data includes various parameters, tool correction amounts, pitch error correction amounts, and predetermined scales used in the scale determining process.

Furthermore, the CNC apparatus includes a manual data input apparatus 15. The data input apparatus 15 comprises a keyboard 16 having symbolic keys and numerical keys etc. for manually inputting various commands, drawing data, NC data and so on, a graphic control circuit 17 for generating image signals based on digital signals supplied from the NCCPU 11 or digital data such as the drawing data and the NC data supplied from a later-described automatic programming processor 31 during the preparation of NC program or the work simulation, a CRT or a liquid crystal display device 18 having a display screen 18a (For example, FIGS. 3 to 6) for displaying images based on the image signals.

Under the display screen 18a, there is provided a plurality of soft keys 19. Each soft key is assigned a different functions so that it can be used selectively depending on the operational modes of the CNC apparatus. Thus, the soft keys can be used for the functions whose number is more than the total number of the soft keys 19. Elements 16, 17, and 19 are connected to the bus 20.

Further, the numerical control apparatus includes a number of spindle control circuits which is more than that of the spindles of the machine tool 40, and servo-amplifiers are provided in the same number as that of the spindle control circuits. A reference numeral 21 denotes one of the spindle control circuits, and a reference numeral 22 denotes one of the servo-amplifier associated with the spindle control circuit 22. Each of the spindle control circuits is connected to the bus 20 so as to control, through the servo-amplifier, corresponding one of the servo-motors of the machine tool 40 in response to shift commands fed from the NCCPU 11.

Moreover, the CNC apparatus is connected to the NCCPU 11 via the bus 20, and has a programmable machine controller (PMC) 23 connected through an input/output unit (not shown) to the operation switches of the machine tool 40, actuators, and sensors. The PMC 23 accommodates a sequence program edited in compliance with a ladder method.

The PMC 23 is constituted to process the control outputs from the NCCPU 11 relating to a support function, a main spindle function, and a tool function (i.e. M function, S function, and T function) in accordance with the sequence program. The signals obtained by processing of the sequence program are sent out to the machine tool 40 to start the actuator. Further, the PMC 23 executes a sequence processing of the signals obtained from the sensors and operation switch and, in turn, sends them to the NCCPU 11.

The CNC apparatus is connected through an interface 24 to external devices such as a paper tape reader, a paper tape puncher, a printer, a floppy disk drive unit etc. (not shown), so that the work program can be read from the paper tape reader to the CNC apparatus and an edited work program can be outputted from the CNC apparatus to the paper tape puncher.

Furthermore, the CNC apparatus comprises an auto-programming processor (APCPU) 31 connected to the bus 20, a ROM 32 storing a program for the auto-programming operation and data for generating an interactive data input screen, an SRAM 33 for temporarily memorizing various data, and a non-volatile memory 34 storing tool data, workpiece configuration data etc., which are required for the auto-programming operation. Memories 32-34 are connected through the bus 35 to the APCPU 31.

In the above-described CNC apparatus, during an auto-programming operation through the interactive method with the operator, not only an interactive data input screen is displayed on the display screen 18a but also the work capable of being carried out or data capable of being set on the display screen 18a are displayed in the form of a menu.

If the operator manipulates the keyboard 16 or the soft keys 19 to manually input data or menu items, the APCPU 31 carries out a data processing.

During editing of the NC program, the work simulation is carried out by use of a background animation in accordance with the NC program data which has already been created. Further, when the NC program is accomplished, the created NC program is stored in the non-volatile memory 34, and is transferred to the non-volatile memory 14.

Then, if the operator selects the work simulation function from the menu, the NCCPU 11 and the APCPU 31 cooperate with each other to execute the work simulation by use of foreground animation in accordance with the created NC program. More particularly, the NCCPU 11 reads out the NC program registered in the non-volatile memory 14 block by block and, in turn, writes it in the RAM 33. The APCPU 31 carries out the work simulation using a graphic animation on the display screen 18a in compliance with the NC program written in the RAM 33.

The operator checks the quality of the edited NC programed or the created NC program with reference to the work simulation. In this case, in order to let the operator not only finely check the workpiece configuration change during the work simulation but also roughly check the overall shift trace of the tool, the work simulation is executed, as described in detail later, on the basis of a display magnification determined as the result of comparison between a predetermined scale suitable for displaying the workpiece configuration change and a scale calculated based on a present shift position of the tool in accordance with the execution of the NC program.

Hereinafter, referring now to FIGS. 2 to 6, the scale determination processing carried out by the NCCPU 11 and the APCPU 31 and also the simulation of cutting process carried out by the APCPU 31 on the basis of the T function code will be explained in detail.

If the operator operates the soft key to select the work simulation function, the APCPU 31 calculates a scale a by which the workpiece is fully displayed in the whole area of the display screen 18a. This scale a is set in the register accommodated in the APCPU 31 and transferred to the RAM 33. And, flag data (hereinafter, referred to as flag) F1, F2 in a first and a second flag memories are initialized to "0", respectively (Step S1).

Figure 3:
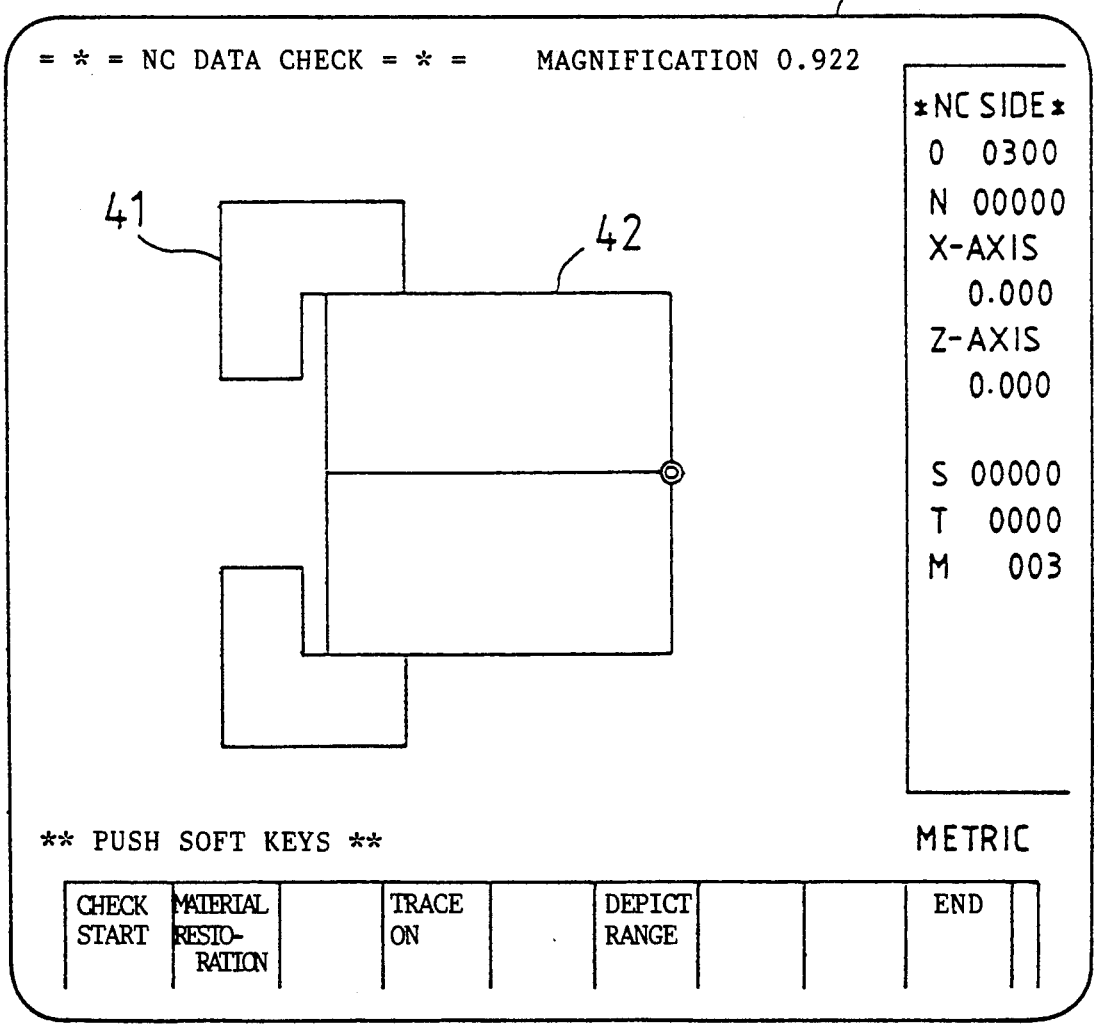
FIG. 3 is a view showing a display screen at the moment of the initiation of the graphic animation.

In accordance with the selection of the work simulation function, the APCPU 31 displays on the display screen 18a an initial screen at the moment of initiation of the graphic animation as shown in FIG. 3. The initial screen displays an outline of a workpiece 42 held by a chuck 41 at a depict magnification corresponding to the predetermined scale a, for example, 0.922. And, the NC data are displayed at the right end portion of the initial screen.

In the NC data shown in FIG. 3, a symbol O denotes a program number; a symbol N a block number; an X-AXIS and a Z-AXIS coordinate data representing a tool position; a symbol S a spindle speed data; a symbol T a tool selection code; and a symbol M a support function code.

Furthermore, the display screen 18a displays various functions assigned to the soft keys 19, that is, "check start", "material restoration", "trace on", "depict range", and "end". By operating a soft key having a depict range determining function, any scale can be determined at any time.

Returning to FIG. 2, the NCCPU 11 starts block by block execution of the NC program when a program check command is inputted through the soft key 19. That is, the initial block of NC program is executed and written in the RAM 33 (Step S2).

Next, the APCPU 31 reads in a present position of the tool (Step S3). A scale b is determined so that both the workpiece 42 and the tool (shown by a reference numeral 43 in FIGS. 4-6) can be displayed together on the same display screen 18a on the basis of the present tool position, and the obtained scale b is stored in the RAM 33 (Step S4).

Then, it is checked whether or not the block executed in the step S2 is the last block (Step S5). If the judgment in the step S5 is NO, the APCPU 31 further checks whether or not the predetermined scale a is larger than the scale b calculated in the step S4 (Step S6).

Immediately after the program check command has been inputted, the tool is located far from the work starting position (i.e. a machine origin point uniquely determined based on a machine type of each machine tool 40). Therefore, the calculated scale b is smaller than the predetermined scale a, and thus, the judgement in the step S6 becomes YES. In this case, the APCPU 31 judges whether the second flag F2 is "0" or "1" (Step S9). The value "1" for the flag F2 means that an animation display relating to the previous block has been carried out by the scale a.

If the judgment in the step S9 is that the second flag F2=0, it is further checked whether the first flag F1 is "0" or "1" (Step S10). The value "1" for the flag F1 means that an animation display relating to the previous block has been carried out by the scale b.

Figure 4:
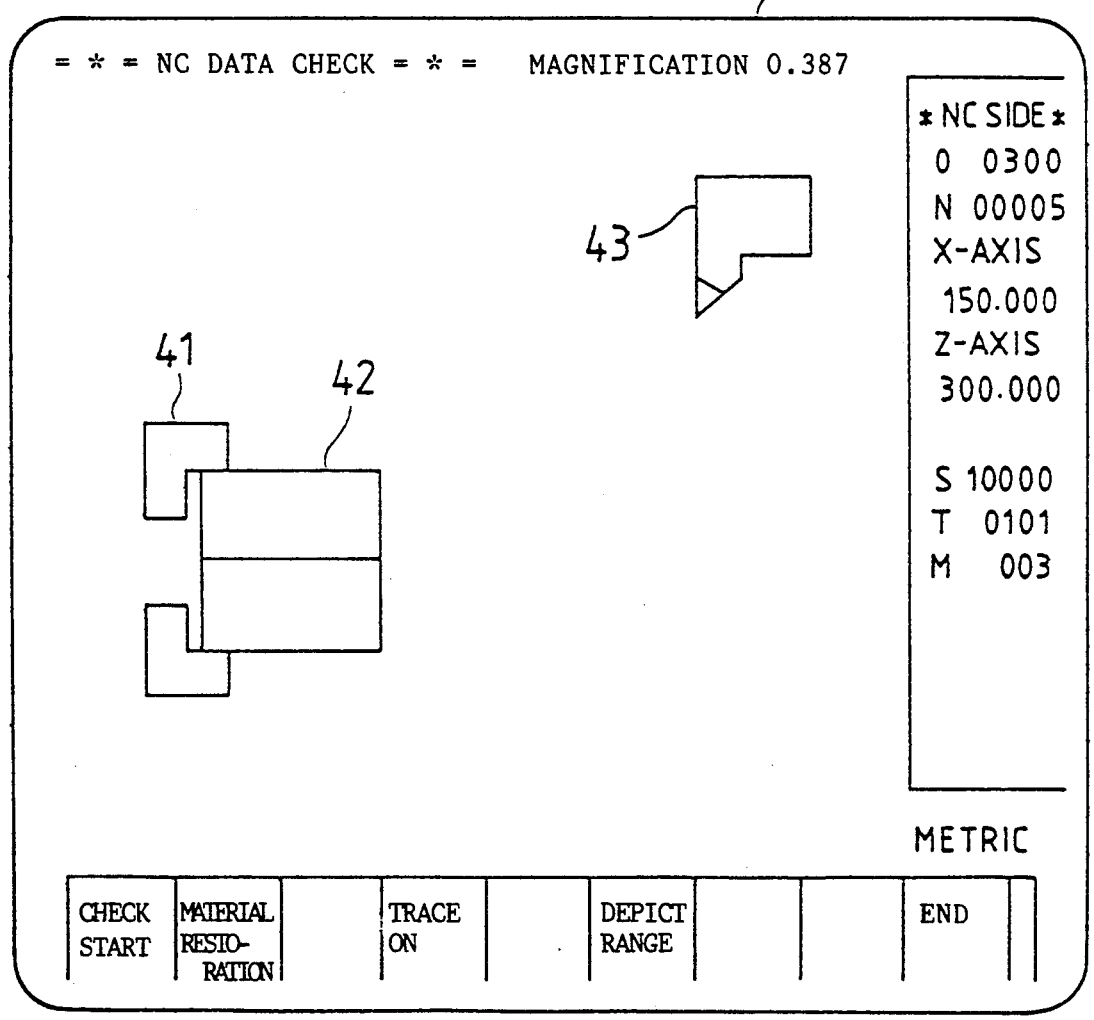
FIG. 4 is a view showing a display screen at the moment of the initiation of the work simulation.

In this stage, the flags have remained unchanged from the initialized condition of F1=F2=0. Therefore, the APCPU 31 next checks whether or not a T code is included in the block executed in the step S2 (Step S11). If it is judged in the step S11 that the T code, which is shown as an example in FIG. 4, is included, the APCPU 31 stores in the RAM 33 the scale b, which is calculated in the step S4 and smaller than the predetermined scale a. And then, the APCPU 31 sets the first flag F1 to "1" and the second flag F2 to "0" (Step S12).

Thus, the APCPU 31 selects a small depict magnification such as 0.387 corresponding to the scale b calculated based on the NC data block written in the RAM 33 by the NCCPU 11 in the step S2, so that the tool 43 located at a work starting position and the workpiece 42 gripped by the chuck 41 can be displayed together on the same display screen 18a (FIG. 4).

Next, after the work simulation advances to successively execute the latest block of the NC program, read in a present position of the tool, calculate the scale b, and judge that the block is not the final one (in the step S2-S5), if the scale b calculated in the step S4 is judged to be greater than the predetermined scale a in the step S6, the APCPU 31 subsequently checks whether or not the first flag F1 is "1". That is, the APCPU 31 checks if an animation display relating to the previous block has been carried out by the scale b, which is smaller than the predetermined scale a (Step S7).

If the judgment in the step S7 is YES, that is, when it is judged that the workpiece configuration change cannot be precisely monitored in the case where the animation display is carried out by the previously calculated smaller scale b, and on the other hand, both the tool and the workpiece can be fully displayed together on the same display screen 18a even by the predetermined scale a, which is smaller than the presently calculated scale b, the APCPU 31 writes the predetermined scale a into the RAM 33 instead of the previously calculated scale b, and the first flag F1 is reset to "0" and the second flag F2 is set to "1", which shows that the animation display is carried out by the predetermined scale a (Step S8).

Figure 5:
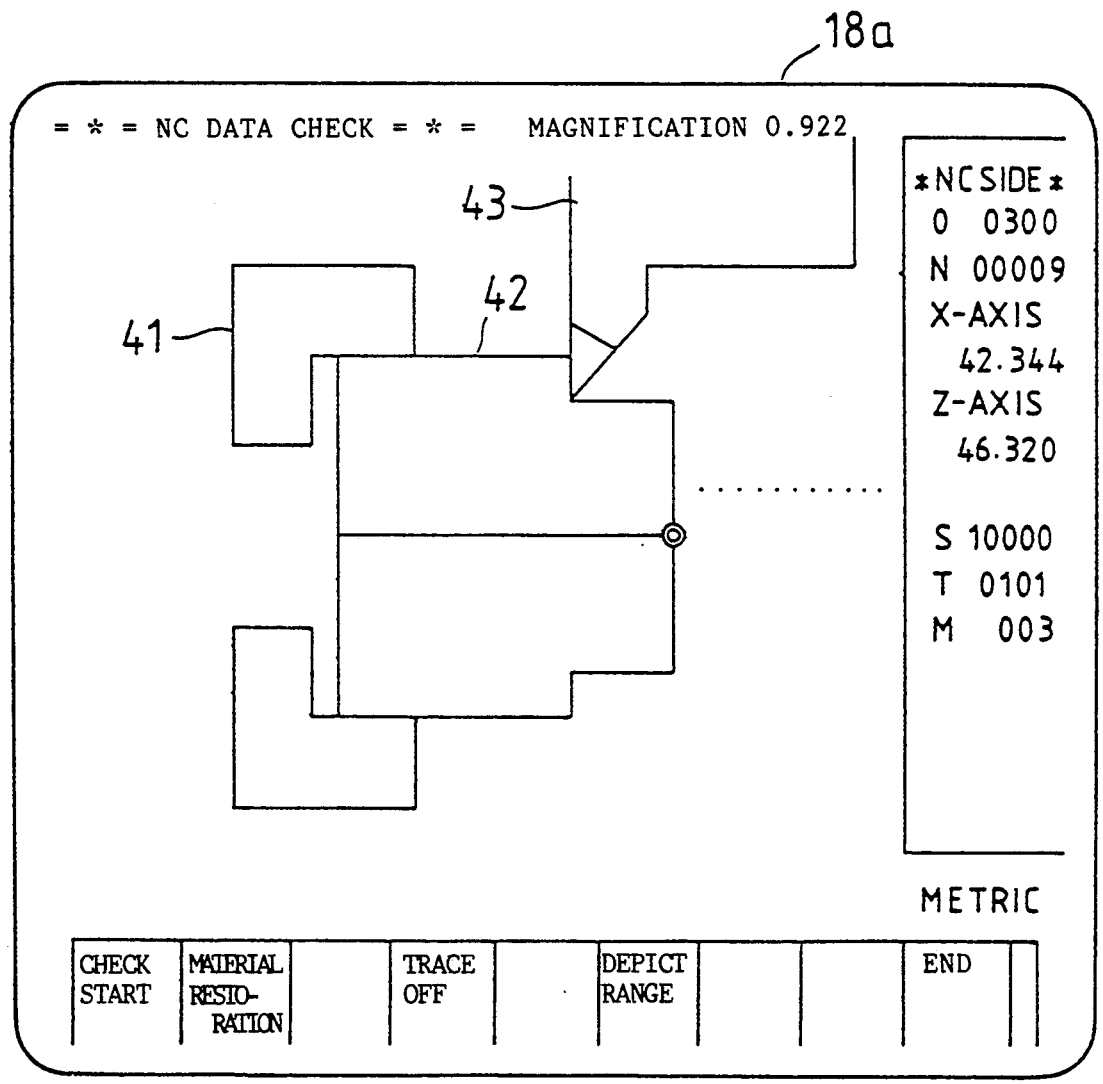
FIG. 5 is a view showing a display screen in course of performing of the work simulation; and, FIG. 6 is a view showing a display screen at the moment of the termination of the work simulation.

The APCPU 31 displays a condition of the workpiece 42 being cut by the tool 43 on the display screen 18a by a large depict magnification 0.922 corresponding to the predetermined scale a (FIG. 5).

In such a manner, if the tool 43 moves from the work starting position towards the workpiece 42 in accordance with the progress of the work simulation, the workpiece 42 can be displayed together with the tool 43 on the display screen 18a even if the workpiece 42 is widely displayed at the large magnification. Thus, it becomes possible for the operator to finely check the workpiece configuration change without interfering with the check of tool shift movement during the work simulation.

After that, in an ending stage of the cutting process in the work simulation, the work simulation progresses to successively execute the latest block of the NC program, read in a present position of the tool, calculate the scale b, and judge whether or not the block is the final block (in the step S2-S5). Then, the scale b calculated in the step S4 is judged to be smaller than the predetermined scale a in the step S6. And further, it is judged in the step S9 that the second flag F2 is F2=1.

In this case, when the predetermined scale a is applied for the animation display, the image of the tool cannot be contained within the screen. Thus, the smaller scale b calculated in step 4 is written into RAM 33 instead of the predetermined scale a. Then, the first flag F1 is set to "1", the value representing the animation display by scale b, and the second flag F2 is set to "2" (step 12).

Figure 6:
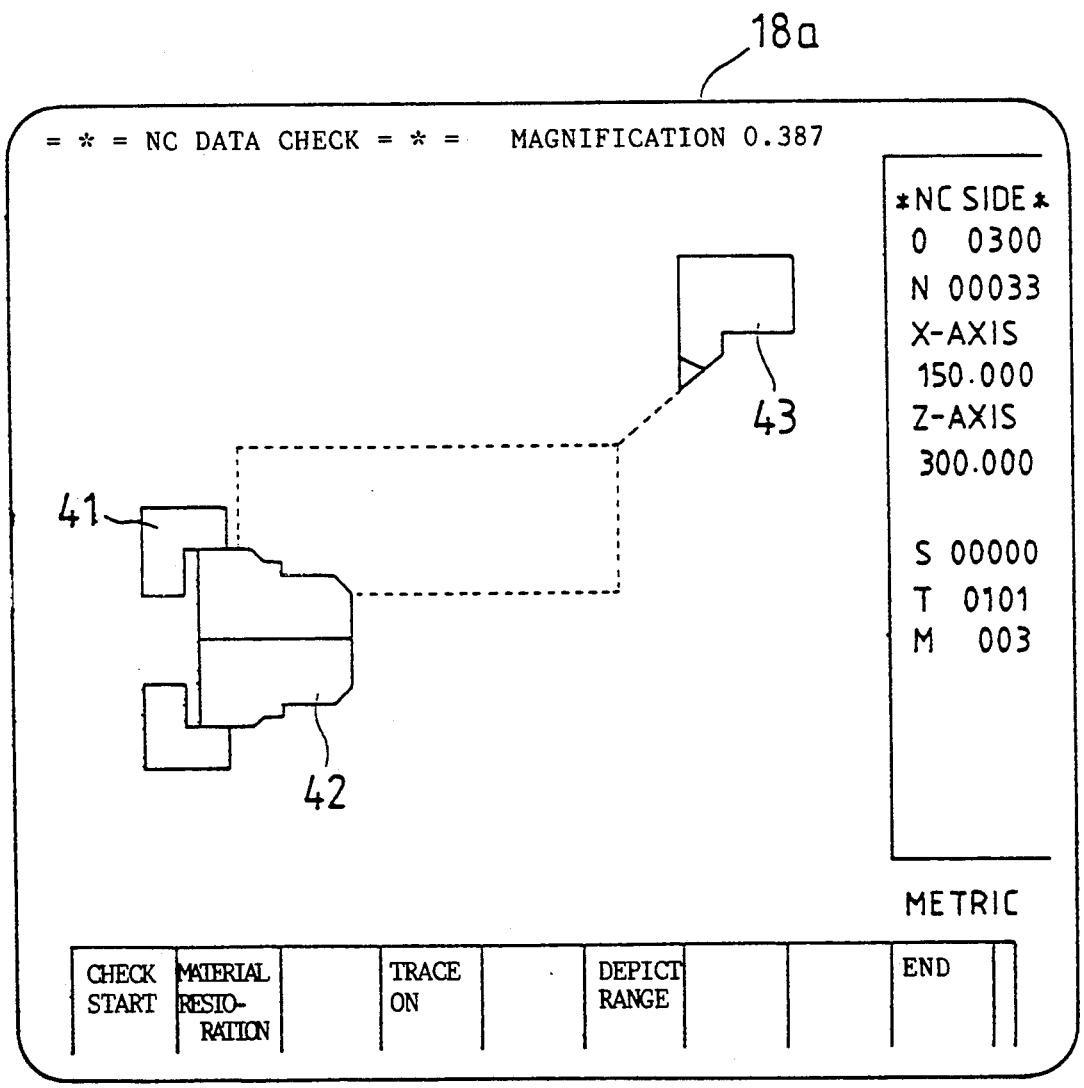

The APCPU 31 displays the condition of the tool 43 together with the chuck 42 and the workpiece 42 on the same the display screen 18a by the small depict magnification 0.387 corresponding to the calculated scale b (FIG. 6).

In such a manner, when the tool 43 returns to the work starting position, the depict magnification is automatically reduced to the smaller magnification so that the check of the tool shift trace can be executed without any interference.

As is explained in the foregoing description, the procedure of the step S3 and the following steps are executed every time when a new program block is read in the step S2 showing the scale determination process. The scale for determining the depict magnification is automatically changed selectively between the small scale b by which the tool shift trace display can be carried out without any interference and the large predetermined scale a by which the workpiece configuration change can be precisely displayed, based on the tool shift position.

As a result, an overall tool shift movement and the workpiece cutting condition are adequately displayed.

Figure 2:
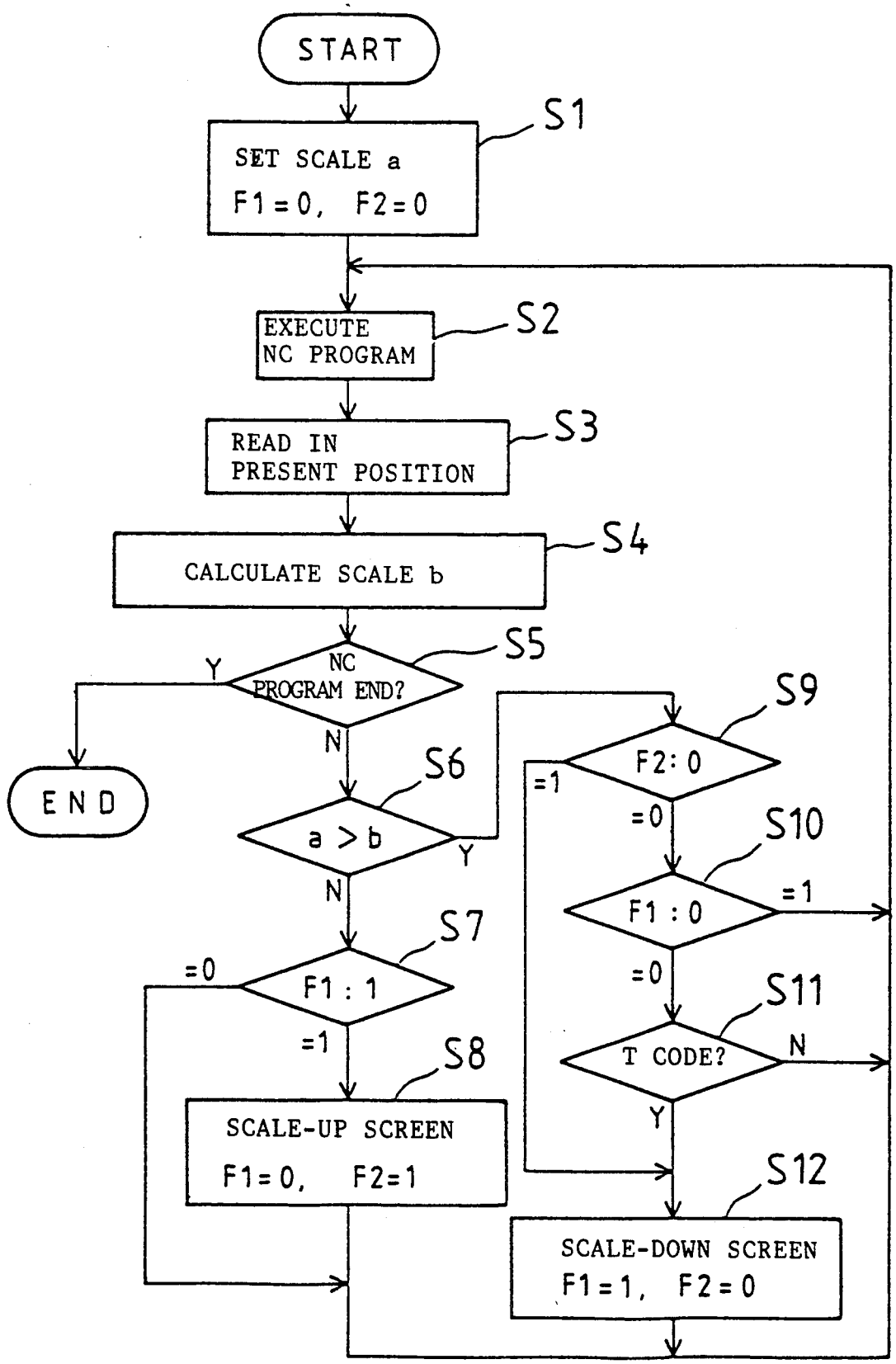
FIG. 2 is a flow chart showing a scale determining procedure in the work simulation utilizing a graphic animation display controlled by the numerical control apparatus.

By the way, after being judged in the step S6 that a newly calculated scale b is smaller than the predetermined scale a in the scale determining procedure of FIG. 2, if the first flag F1 is judged to be "0" in the step S7 or if it is judged that the animation display with respect to the previous block is carried out by the small scale change is not necessary, and thus the scale change will not be made.

In the same manner, the scale will not be changed when the first flag F1 is judged to be "1" in the step S10, or when it is judged in the step S11 that the T code is not included in the program block.

What is claimed is:

1. A numerical control apparatus having a work simulation function capable of displaying both a workpiece configuration change and a tool shift movement on the same display screen in accordance with an execution of a numerical control program, said numerical control apparatus comprising:

a scaling means for presetting a first display scale for displaying a workpiece configuration change;

an arithmetic means for calculating a second display scale for displaying both the workpiece configuration change and a corresponding tool shift movement at its present shifted position on the same display screen, based on the present shifted position of the tool according to an execution of a numerical control program; and a magnification determining means for comparing the first display scale and the second display scale and for determining a display magnification, for displaying both the workpiece configuration change and the corresponding tool shift movement on the same display screen, based on a result of the comparison so that a work simulation can be executed.

2. A numerical control apparatus in accordance with claim 1, wherein said magnification determining means includes a comparison means for comparing said first display scale and said second display scale, and a magnification change means for changing the display magnification based on the result of the comparison by the comparison means.

3. A numerically controlled apparatus in accordance with claim 2, wherein said numerical control apparatus further includes means for performing said work simulation by executing said numerical control program block by block, and said magnification change means changes the display magnification according to a flag data representing a display scale used for the work simulation performed by executing a previous said program block.

4. A numerical control apparatus in accordance with claim 1, wherein said scaling means determines said first display scale so that the workpiece can be fully displayed on the display screen.

5. A numerical control apparatus in accordance with claim 1, wherein said arithmetic means calculates said second display scale by which the tool located at a work starting position can be displayed together with the workpiece on the same display screen.

* * * * *